United States Patent Office 3,154,419
Patented Oct. 27, 1964

3,154,419
METHOD OF MAKING A BAKED
CEREAL PRODUCT
Joseph J. Thompson and Winston F. Allen, Battle Creek, Mich., assignors to Kellogg Company, Battle Creek, Mich., a corporation of Delaware
No Drawing. Filed Feb. 19, 1962, Ser. No. 174,257
5 Claims. (Cl. 99—80)

This invention relates to the production of ready-to-eat food products composed essentially of cereals or cereal components.

More particularly the present invention relates to the production of cereal food products composed principally of wheat flour and of reduced starch content and conversely high protein content.

The present invention relates in general to the production of baked food products composed principally of high gluten wheat flour and added vital wheat gluten, the dough being formed and baked in a manner to provide, for example, biscuit-like products characterized by uniformity and relatively high degree of expansion with overall desirable texture, crispiness and tenderness with a minimum of large cavities in the product, and of substantially uniform cellular structure. The product is further characterized by an attractive crust having bright, glazed, firm surface of medium straw to golden brown color with a pure white inside appearance.

It is an object of the present invention to provide a baked food product of novel composition as aforesaid which does not require any special or involved processing equipment and one wherein the nutritional quality of the materials during processing is preserved and one which permits better and easier control and uniformity of the end product.

The product and process of the present invention are particularly characterized by control of temperature of the dough during formation thereof; control of the normal acidity of the dough to the extent that it is substantially neutral; and control of the atmosphere in which the dough is baked.

As previously indicated, the present invention employs added vital wheat gluten as the characterizing component of the dough.

It has been known in the past to treat wheat flour in the process of separating the gluten from the starch content thereof with basic materials such as calcium or sodium carbonate, sodium potassium or calcium hydroxide and the like, and which as a result leave residues in the final product of calcium, sodium, potassium and the like, which basic materials are at times undesirable for certain dietary requirements. It is, therefore, one of the objects of the present invention to employ vital wheat gluten which has been prepared without the aid of basic materials as aforesaid, but with the basic material ammonium hydroxide which is driven off during the baking process, and which as a result does not leave any basic residue in the baked product.

For the purpose of accomplishing the aforesaid objects of the present invention, and as an end thereto for the production of a dough which can be mechanically worked to smooth, silky, elastic and cohesive but not adhesive character, we prepare the dough of the present invention from water containing ammonia (ammonium hydroxide) so as to substantially neutralize the dough or to bring it to a pH of from about 6.5 to about 6.9. We have found that not only does this facilitate the processing of the dough by mechanical means but that the ammonia treatment has a desirable effect on the end product such as puffability and fine texture, and overall does not leave any basic residues in the final product. The addition of this alkaline material also desirably modifies the proteins in the dough.

As a characterizing control of the dough formation of the present invention and in order to aid in the mechanical working and for retention of the aforesaid smooth, silky and elastic character thereof, we have found that the dough first during initial mixing and second during high-speed beating should be retained relatively cool, that is at a temperature of from about 105 to about 125° F. and preferably at a temperature of from about 110 to about 120° F. Higher temperatures result in destruction of the smooth, silky and elastic character of the dough and cause it to become stringy and start to deteriorate with impairment of desired puffing of the final product. That is to say, if the dough during this mechanical working is permitted to become heated to temperatures in excess of 120– 125° F., the dough becomes rough and granular, less elastic and breaks.

As a further characterizing feature of the present invention, we have found that in order for the dough to smoothly puff and to expand to a high and desired extent and to withall have a crust of bright, firm and glazed character, that the atmosphere in which the dough is baked should be controlled so that it remains plastic without premature crust formation. Thus we have found that these desirable effects and end properties are obtained by baking the aforesaid dough in a zone or oven having a nearly saturated water vapor atmosphere, that is to say, an atmosphere of steam maintained at atmospheric or slightly above atmospheric temperature.

In one specific embodiment of the present invention, the process is carried out by mixing sufficient vital wheat gluten with a high gluten wheat flour to obtain a dough of about 40% protein content on an 8% moisture basis. To this flour mixture there is then added a calculated amount of cold water containing sufficient ammonium hydroxide (about 0.083 part of $NH_3$ to 100 parts of flour mix by weight on a moisture free basis) so that the dough produced, which will ordinarily have a pH of about 5.8, will have a pH of about 6.9 and a moisture content of about 45–55% by weight.

The vital wheat gluten employed in this example is a spray dried product prepared wholly without the aid of basic materials although, as will appear in the specific embodiment to be hereinafter described, it can be prepared with the aid of ammonium hydroxide so that no basic residues will remain in the final baked product where it is used.

The aforesaid wheat flour, vital wheat gluten and ammoniated water are suitably mixed in a Z type heavy duty dough mixter first at a slow speed for about five to about 15 minutes. The dough mixer has a jacket through which cold water is circulated. After mixing the dough is permitted to stand in the mixer for about 20 minutes, whereupon the mixer is speeded up to provide a very rapid beating action and then run continuously for about 15 minutes without covering. The temperature of the dough is not permitted to rise above 120° F. The resulting dough was of a fine texture, being smooth, silky and elastic and could be stretched by hand to a fine string during the last part and immediately after the beating operation.

This dough is then immediately transferred to, for example, shallow stainless steel trays, whereon it is pressed or rolled into slabs of about 1¼ inches in thickness. In the alternative, the dough can be extruded and cut into pieces of desired shape and cut to size. For example, the dough can be cut into strips ⅝ inch to ¾ in width, and then into rectangular pieces of about 1¼ inches by ¾ inch by ¾ inch which will provide a baked roll weighing from 5.0 to 5.5 grams when dried to a 7–9% moisture content.

The dough, either cut to desired size or in lengths, may be covered and allowed to chill in a refrigerator for a convenient length of time, say over night, before baking, or if desired the warm dough can be promptly extruded and cut into suitable sized pieces and baked immediately after preparation.

For the purpose of baking, the dough pieces as aforesaid are spaced onto stainless steel screen bottom trays about 4 inches apart just before baking. Baking is carried out in a forced air electric oven preheated to about 360° and the atmosphere in the oven maintained at substantially 100% relative humidity by means of steam which is introduced into the oven, for example, through a 30 pounds per square inch gauge steam pressure line. This slightly superatmospheric pressure causes a small amount of steam to be forced out at the edges of the closed oven door, or otherwise permitted to escape, so as to prevent more than a slight superatmospheric pressure to build up in the oven during the baking operation, but to maintain a substantially saturated atmosphere to prevail in the oven.

The baking under the aforesaid very high relative humidity is continued for about 15 minutes at a temperature of approximately 350° F. with a gentle hot air circulation by means of, for example, a fan in the presence of the steam as above set forth. The introduction of steam is then discontinued and the temperature lowered by increased circulation of the fan from say 465 r.p.m. to 1110 r.p.m. with the oven doors opened so that the oven temperature drops to about 275° F. in about three minutes, and this temperature is then maintained for a period of about 12 minutes.

The resulting puffed and partially dried product is removed from the oven and allowed to remain on the screen bottom trays over night at a temperature of about 90–100° F. in order to dry them to the center so as to contain a moisture content of about 7–9%.

In general the pieces of dough may be baked at temperatures of from about 325 to 450° F. with corresponding adjustment of time to obtain the desired color and expansion, and drying temperatures may also be held below 275° F. for longer periods of time.

In carrying out the foregoing process, and as a specific formulation, there is employed high gluten wheat flour having a moisture-free content of 58 parts by weight to 42 parts by weight of vital wheat gluten, also on a moisture-free basis.

The wheat flour as used had a 9% moisture content, and a protein content of 16.2% (N x 5.7), equivalent on a moisture-free basis to 10.32 grams per 100 grams on a moisture-free basis.

The vital wheat gluten has a 5.1% moisture content, and a protein content as used of 75.5% equivalent to 33.42 grams per 100 grams on a moisture-free basis.

In other words, the dough composed of the aforesaid proportions of wheat flour and vital wheat gluten had a protein content on a moisture-free basis of 43.74%. A 50% moisture content dough is prepared employing ammonium hydroxide diluted with water to give a 6.3% $NH_3$ solution in water.

Although the foregoing example comprises the use of wheat flour and vital wheat gluten to form a product having about 40–45% protein content, it will be understood that additives may be incorporated which per se may or may not contribute to and provide a proportion of the protein content. For example, casein may be incorporated as well as non-fat dried milk, soy protein, and the like.

In another specific embodiment of the present invention, and as previously indicated, freshly prepared vital gluten may be employed. Thus, instead of mixing dry vital gluten with high protein wheat flour, most of the starch is washed out of high protein wheat flour and then sufficient dry wheat flour is added to the wet gluten to obtain a stiff dough containing the desired reduced starch and increased protein content. In this embodiment ammonia is used in the water for preparing a dough of high protein wheat flour to aid in the partial dispersion of the gluten and for easier and more thorough washing of the starch therefrom.

Thus, a dough is prepared in a Z type heavy duty dough mixer using, for example, 100 parts by weight of high protein wheat flour and 65 parts by weight of cold water (iron free to prevent discoloration) and containing sufficient ammonia to give the water a pH of 9.4 and the dough a pH of 8.0. After mixing the dough at a slow speed for six minutes, it is allowed to stand to hydrolyze for at least about 30 minutes while covered. This gluten dough is then washed a number of times, to remove starch, using cold water with added ammonia to a pH of 9.6. After each wash, the starch water is poured through a No. 40 screen and the remaining wet gluten kneaded and drained on the screen 5 to 10 minutes after each wash. The recovered wet gluten at a pH of about 8.1 is put back into the dough mixer and a calculated amount of dry high protein wheat flour for example 66.7 parts flour to 100 parts of wet gluten containing 71.5% water, is added slowly while mixing at slow speed. The mixing is continued for a total of six minutes. Finally, the dough is intensively worked or agitated for 15 minutes with cold water circulating through the jacket of the mixer with the cover removed, so that the temperature does not rise above 120° F. and when the dough arrives at a smooth, silky, cohesive, non-adhesive character it is recovered at a pH of about 6.7–6.8. Following this, it is either stored or promptly used for baking in pieces of desired size and weight in the manner previously described.

We claim:

1. The method of making a crisp, tender basic-residue-free food product of substantially uniform cellular structure and having a crust of bright, firm, glazed character which comprises substantially neutralizing a dough composed of a mixture of wheat flour and added vital wheat gluten with ammonia, and baking it in an oven while maintaining therein a high relative humidity.

2. The method of making a crisp, tender basic-residue-free food product of substatially uniform cellular structure and having a crust of bright, firm glazed character which comprises mixing and mechanically working a dough composed essentially of high gluten wheat flour and added vital wheat gluten at a temperature of from about 105 to 125° F., and while maintaining it at a pH of from about 6.5 to about 6.9 by addition of ammonium hydroxide, until the dough becomes smooth, silky and elastic and then baking it in a zone maintained at a nearly saturated water vapor atmosphere.

3. The method of making a crisp, tender basic-residue-free food product of substantially uniform cellular structure and having a crust of bright, firm, glazed character which comprises mixing and mechanically working a dough composed essentially of high gluten wheat flour and added vital wheat gluten having a moisture content of from about 45 to about 55% at a temperature of from about 110 to 120° F., and while maintaining it at a pH of from about 6.5 to about 6.9 by addition of ammonium hydroxide, until the dough becomes smooth, silky and elastic and then baking it first in a substantially but incompletely closed zone maintained at a nearly saturated water vapor atmosphere at a temperature of from about 325 to about 450° F., and then in the open and at low relative humidity and a temperature below about 275° F., then terminating said baking and drying the resulting product to a moisture content of about 7–9%.

4. The method of making a starch reduced baked wheat flour basic-residue-free food product which comprises mixing wheat flour and ammoniated water to form a basic dough, separating gluten from starch in said dough by washing it with ammoniated water, mixing the resulting recovered wet vital gluten with added high gluten wheat flour to form a dough of from about 45 to about 55% moisture content and a pH of from about 6.5 to about 6.9, mechanically working said dough while maintaining its temperature below about 120° F., and then baking it at a temperature of from about 325° F. to about 450° F. in a substantially but incompletely closed zone and an atmosphere of steam providing a very high relative humidity.

5. In a process of separating starch from wheat gluten and for recovering vital wheat gluten as a product of the process adapted for the production of basic-residue-free baked food products the steps which comprise forming a dough by mixing a high gluten wheat flour with cold water containing ammonia to form a basic dough, having a pH of at least 8.0, permitting the dough to hydrolyze, washing starch therefrom, and recovering the gluten residue by kneading and intermittently washing the starch therefrom a plurality of times.

References Cited in the file of this patent

UNITED STATES PATENTS

| 1,586,869 | Wesener | June 1, 1926 |
| 3,027,258 | Markakis et al. | Mar. 27, 1962 |

FOREIGN PATENTS

| 602,413 | Canada | July 26, 1960 |